(12) United States Patent
Kizewski (10) Patent No.: US 6,170,839 B1
(45) Date of Patent: Jan. 9, 2001

(54) TOOL CART

(76) Inventor: Chris L. Kizewski, W. 331 S. 8197 James Dr., Mukwonago, WI (US) 53149

( * ) Notice: Under 35 U.S.C. 154(b), the term of this patent shall be extended for 0 days.

(21) Appl. No.: 09/265,449

(22) Filed: Mar. 10, 1999

(51) Int. Cl.$^7$ .................................. B62B 1/00; B62B 1/04
(52) U.S. Cl. ...................................... 280/47.26; 280/47.19
(58) Field of Search ............................ 280/47.23, 47.24, 280/47.34, 47.35, 47.371, 47.16–47.19, 47.2, 47.26–47.28, 47.315, 42, 42.13, 37, 655, 655.1, 638, 641, 645, 651, 652, 654

(56) References Cited

U.S. PATENT DOCUMENTS

| | | | |
|---|---|---|---|
| 3,785,669 | 1/1974 | Doheny | 280/47.18 |
| 4,457,527 * | 7/1984 | Lowery | 280/47.19 |
| 4,976,450 | 12/1990 | Ellefson | 280/79.11 |
| 5,378,005 * | 1/1995 | Norton | 280/47.26 |
| 5,452,908 | 9/1995 | Bencic | 280/47.35 |
| 5,489,106 * | 2/1996 | Engelking et al. | 280/47.35 |
| 6,065,421 * | 5/2000 | Haller et al. | 114/347 |
| 6,070,288 * | 6/2000 | Luyckx et al. | 15/323 |

* cited by examiner

Primary Examiner—Brian L. Johnson
Assistant Examiner—Tony Winner
(74) Attorney, Agent, or Firm—Donald J. Ersler (57) ABSTRACT

A tool cart includes a tool chest, a convertible hand truck, a tool box, at least one extension cord reel, netting structure, and at least one side storage bag. The tool chest has a plurality of drawers and is securely fastened to the convertible hand truck. The tool box is securely fastened to a top of the tool chest. One extension cord reel is attached to each side of the tool box. The tool chest and tool box may be locked for security reasons. The netting structure may be fastened around projections extending from each side of the tool chest for retaining spools of wire and the like. At least one side storage bag is attached to a side of the tool chest to act as a cover for power tools. The tool cart is preferably transported by pushing thereof in a horizontal position. The tool cart is preferably placed in a vertical position during use.

20 Claims, 9 Drawing Sheets

TOOL CART

BACKGROUND OF THE INVENTION

1. Field of the Invention

The present invention relates generally to tool chests and hand trucks, and more specifically to a tool cart which holds a variety of tools and materials for telecommunications and data communications line installations.

2. Discussion of the Prior Art

A problem frequently encountered when doing line installations in buildings is getting all the tools and materials needed for the job into the work area without making numerous trips to and from a vehicle. Line installations require a variety of tools and materials such as hand tools, power tools, extension cords, multiple position electrical outlets, spools of wire, and electrical connectors. There are at least two portable tool chests/work surfaces such as those disclosed in a U.S. Pat. No. 4,976,450 to Ellefson, and U.S. Pat. No. 5,452,908 to Bencic. However, neither of these designs address the unique requirements for transporting tools and materials needed to do telecommunications or data communications line installations.

Accordingly, there is a clearly felt need in the art for a tool cart which retains and provides for transportation of a variety of tools and materials to and from a work site and also provides a work surface for an installer.

SUMMARY OF THE INVENTION

The primary objective of the present invention is to provide a tool cart which retains and provides for transportation of a variety of tools and materials to and from a work site and also provides a work surface for an installer.

According to the present invention, a tool cart includes a tool chest, a convertible hand truck, a tool box, at least one extension cord reel, a netting structure, and at least one side storage bag. The tool chest has a plurality of drawers and is securely fastened to the convertible hand truck. The tool box is securely fastened to a top of the tool chest. The tool box has two handle bores in a front thereof for providing clearance for the insertion of a push handle. One extension cord reel is preferably attached to each side of the tool box. A hole is formed in each side of the tool box to receive an end of an extension cord. The tool chest and tool box may be locked for security reasons. The netting structure may be fastened around projections extending from each side of the tool chest. Spools of wire may be placed on the front of the tool chest while thereof is in a horizontal position for transportation. The netting structure prevents the spools of wire from falling off during transport. At least one side storage bag is attached to a side of the tool chest to act as a cover for power tools. The tool cart is preferably transported by pushing thereof in a horizontal position. The tool cart is preferably placed in a vertical position during use.

Accordingly, it is an object of the present invention to provide a tool cart which may be used to transport a large quantity of tools and material for line installations.

It is a further object of the present invention to provide a tool cart which provides a working surface for a user.

Finally, it is another object of the present invention to provide a tool cart which allows a large quantity of tools and material to be neatly and securely stored.

These and additional objects, advantages, features and benefits of the present invention will become apparent from the following specification.

DETAILED DESCRIPTION OF THE PREFERRED EMBODIMENTS

Figure 1:
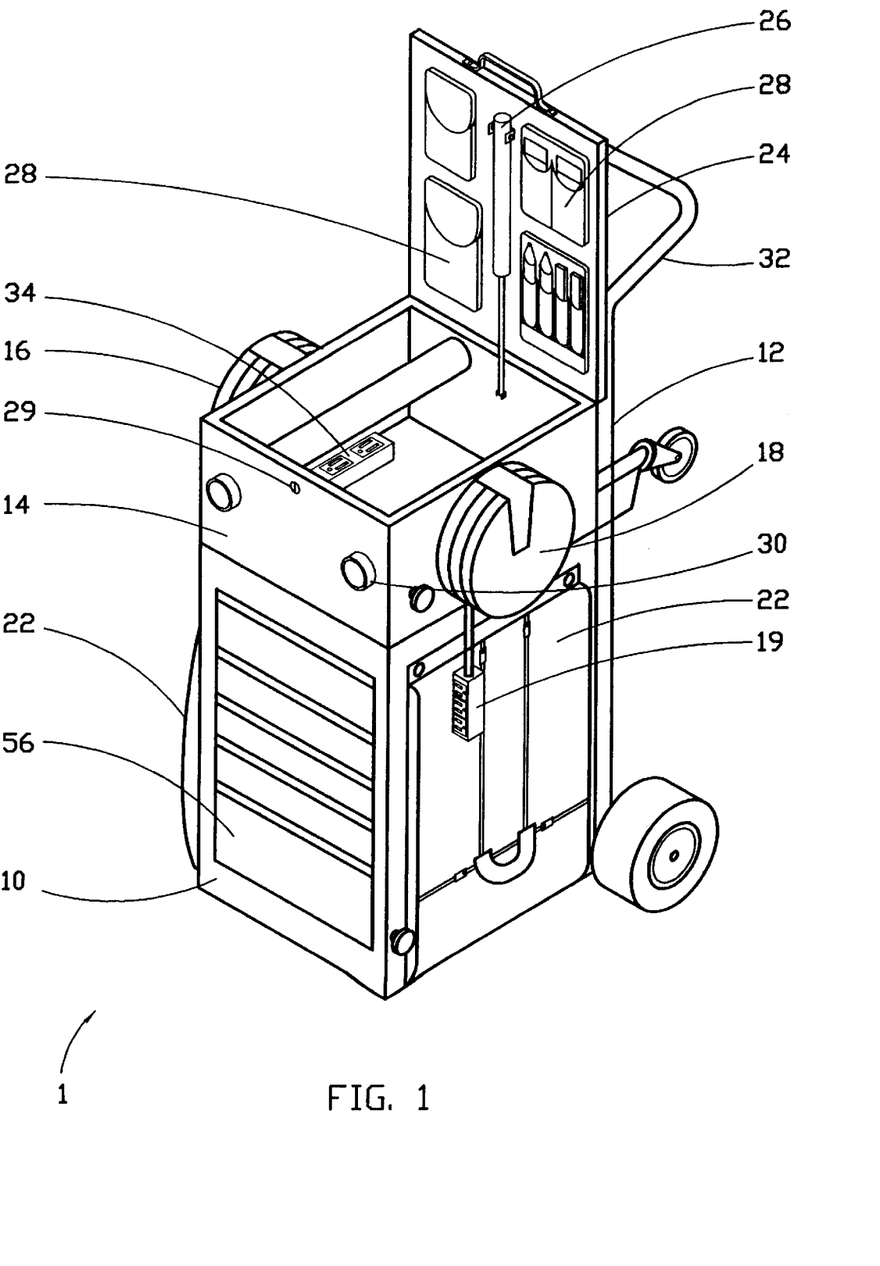
FIG. 1 is a front perspective view of a tool cart with the tool box opened in accordance with the present invention.

With reference now to the drawings, and particularly to FIG. 1, there is shown a front perspective view of a tool cart 1. With reference to FIGS. 2–6, the tool cart 1 includes a tool chest 10, a convertible hand truck 12, a tool box 14, a first extension cord reel 16, a second extension cord reel 18, netting structure 20, and at least one side storage bag 22. The tool chest 10 has a plurality of drawers for storage of tools and materials. The tool chest 10 is preferably manufactured by Craftsman. Craftsman is registered trademark of Sears Corporation. Tool chests manufactured by other companies may also be used. The tool chest 10 is securely fastened to the convertible hand truck 12 with fasteners, welding, or any suitable attachment method. The convertible hand truck 12 is preferably a 500 pound version manufactured by Harper Trucks, Inc. Convertible hand trucks manufactured by other companies may also be used.

Figure 1A:
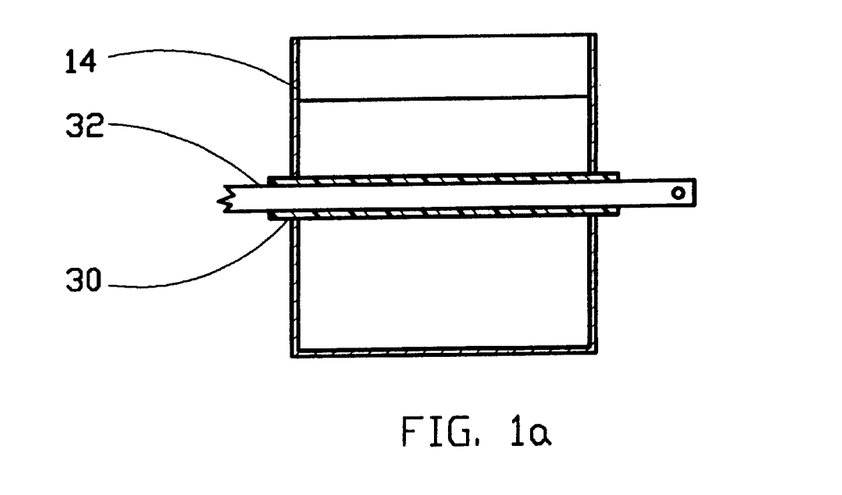
FIG. 1a is a cross-sectional view of a tool box with a handle tube for receiving a push handle in accordance with the present invention.

The tool box 14 is securely fastened to a top of the tool chest 10 with fasteners, welding, or any suitable attachment method. The tool box 14 preferably has a lid 24 which is retained in an upright position with a lid support 26. The lid support 26 may be a door opener or a gas shock. A plurality of pouches 28 are preferably fastened to a back side of the lid 24 for the retention of various tools. The lid 24 preferably has a lock 32 to defer theft of the contents inside the tool box 14. FIG. 1a shows a cross-sectional view of a handle tube 30 formed through the depth of the tool box 14. The handle tube 30 is preferably fabricated from PVC tubing having an inner diameter which loosely receives the push handle 32. Holes formed in the front and back of the tool box 14 could also be used.

A first extension cord reel 16 is attached to a side of the tool box 14. One end of the first extension cord reel 16 is available to be plugged into an electrical outlet. The other end of the first extension cord reel 16 is connected through a hole in the tool box 14 side wall to a multiple position electrical outlet 34. A second extension cord reel 18 is attached to the side opposite the first extension cord reel 16. One end of the second extension cord reel 18 is electrically connected to the electrical cord of the first extension cord reel 16. The other end of the second extension cord reel is a female outlet 19 available for power tools or the like.

Figure 3:
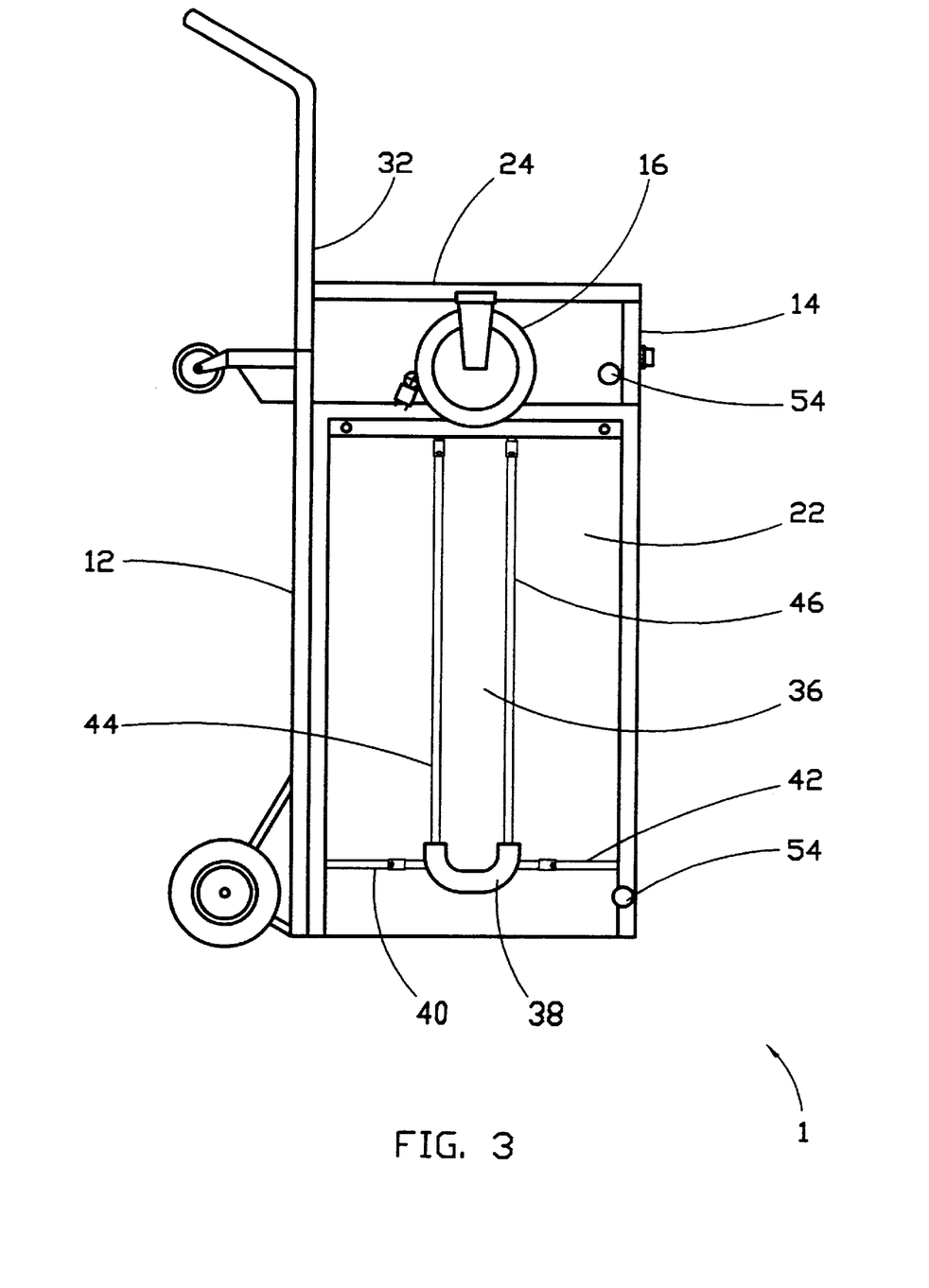
FIG. 3 is a side view of a tool cart in accordance with the present invention.
Figure 4:
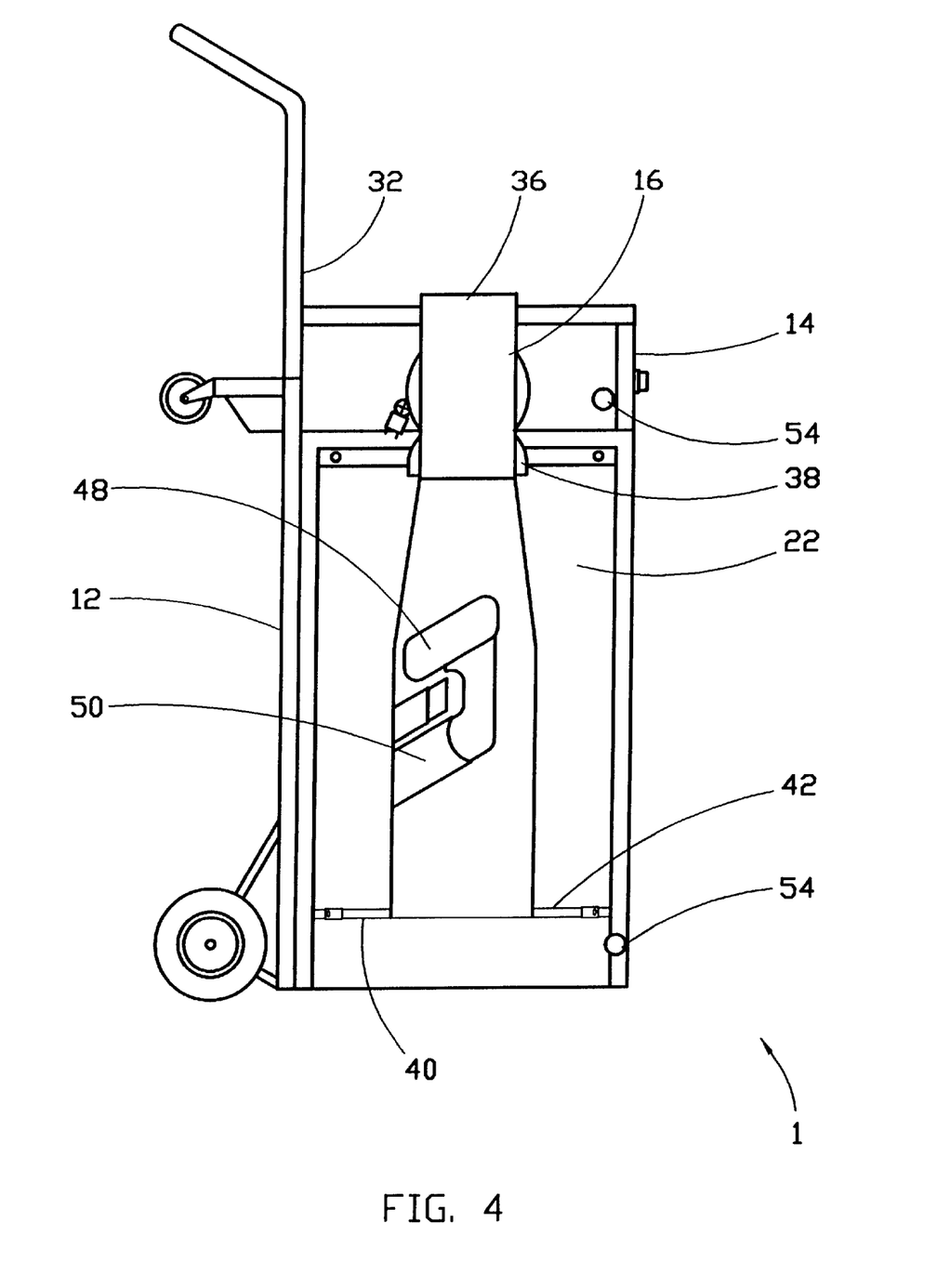
FIG. 4 is a side view of a tool cart with the side storage bag unzipped to show a power tool stored therein in accordance with the present invention.

At least one storage bag 22 is attached to a side of the tool chest 10 in FIG. 3. The storage bag 22 is similar to a normal garment bag with the exception of a middle portion 36. The middle portion 36 of the storage bag 22 may be zipped up and down with a zipper handle 38. The zipper handle 38 is attached to a zipper tab of a first vertical zipper 44 and to a zipper tab of a second vertical zipper 46. A first horizontal zipper 40 and a second horizontal zipper 42 also provide further access to the inside of the storage bag 22. FIG. 4 shows all the zippers in an unzipped position to reveal a power tool 48. The power tool holster 50 is bolted to a side of the tool chest 10. Other power tools may be attached to the side of the tool chest and covered by the closed storage bag 22.

Figure 1B:
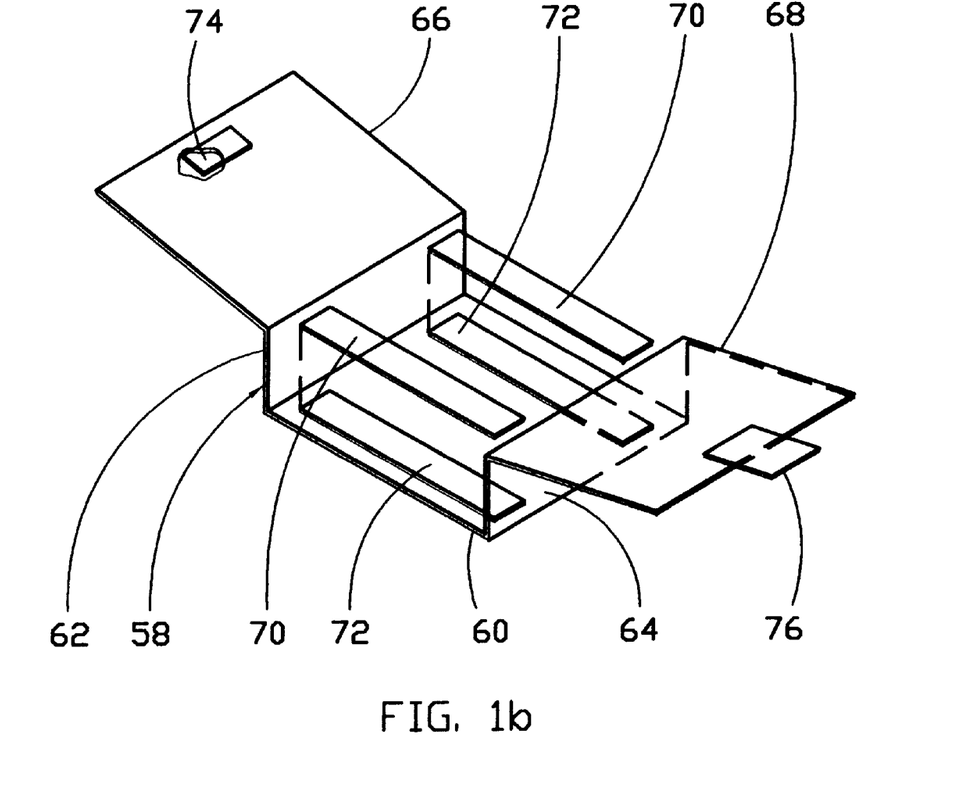
FIG. 1b is a partially exploded perspective view of a tool tray which may be placed in the bottom drawer of the tool chest in accordance with the present invention.

FIG. 1b shows a tool tray 58 which is fastened to preferably the inside of a bottom drawer 56 of the tool chest 10. The tool tray 58 includes a bottom 60, a first side wall 62, a second side wall 64, a first flap 66, and a second flap 68. The first side wall 62 extends upward from one side of the bottom 60 and the second side wall 64 extends upward from the other side thereof. The first flap 66 is bendable relative to the first wall 62 and the second flap 68 is bendable relative to the second wall 64. The following hook and loop fasteners may be sold under the registered trademark, "Velcro." A hook fastener pad 76 is attached to the second flap 68 and a loop fastener pad 74 is attached to the first flap 66 such that the first and second flaps may be fastened to each other. At least one loop fastener strip 72 is attached to the bottom 60. Tools are retained by sandwiching the tools between the hook fastener strip 70 and the loop fastener strip 72. Each hook fastener strip or pad may be interchanged with a loop fastener strip or pad and each loop fastener strip or pad may be interchanged with a hook fastener strip or pad. The tool tray 58 is preferably fabricated from a durable synthetic fabric which is reinforced with cardboard. Other materials may also be used.

Figure 2:
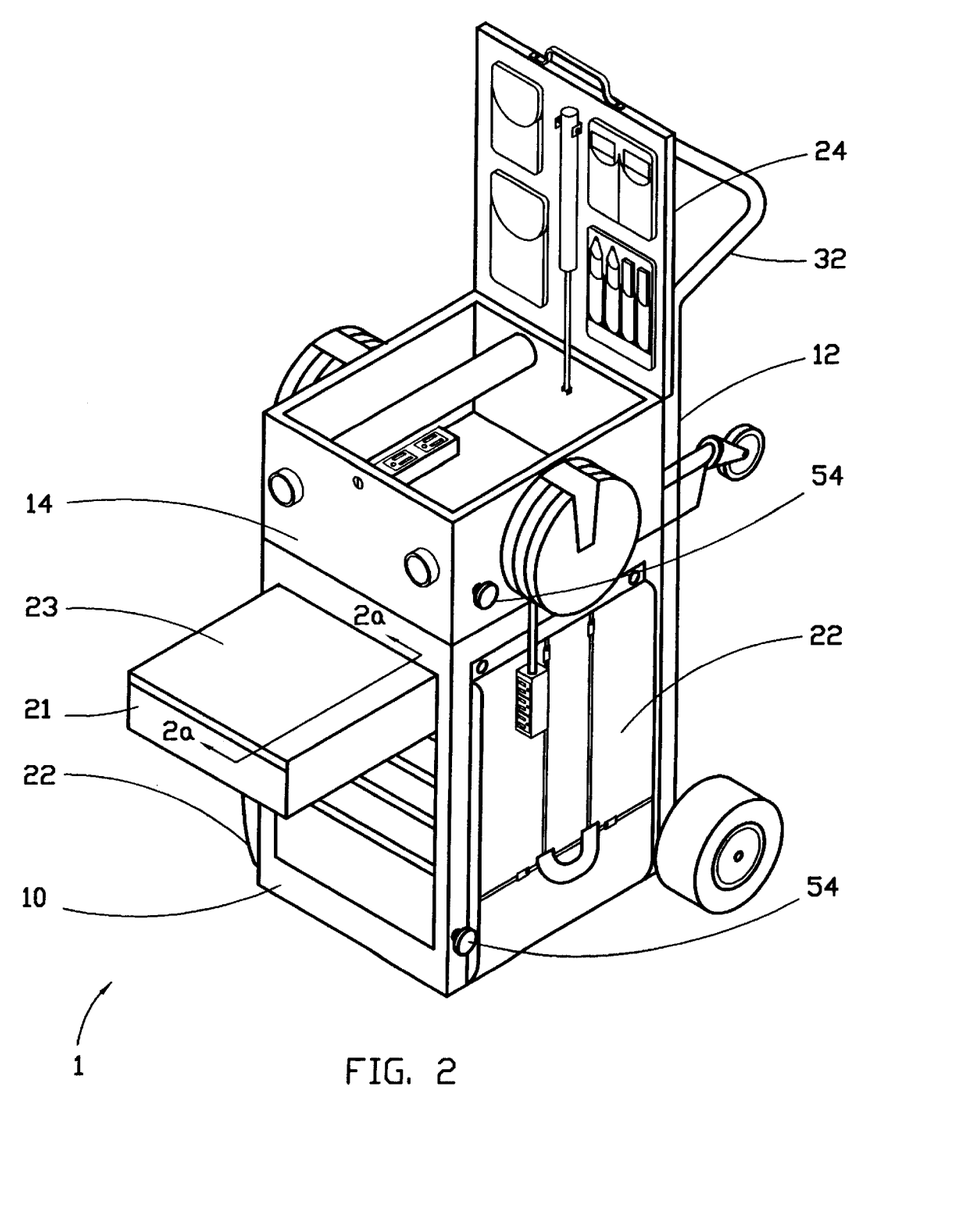
FIG. 2 is a front perspective view of a tool cart with the top draw of the tool chest pulled out in accordance with the present invention.
Figure 2A:
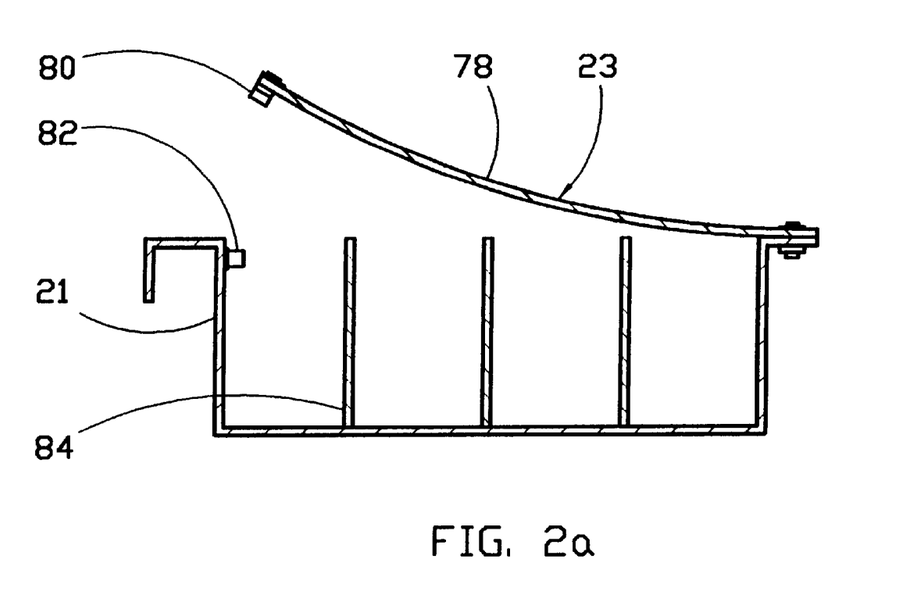
FIG. 2a is a cross-sectional view of a work surface attached to a drawer in accordance with the present invention.
Figure 2B:
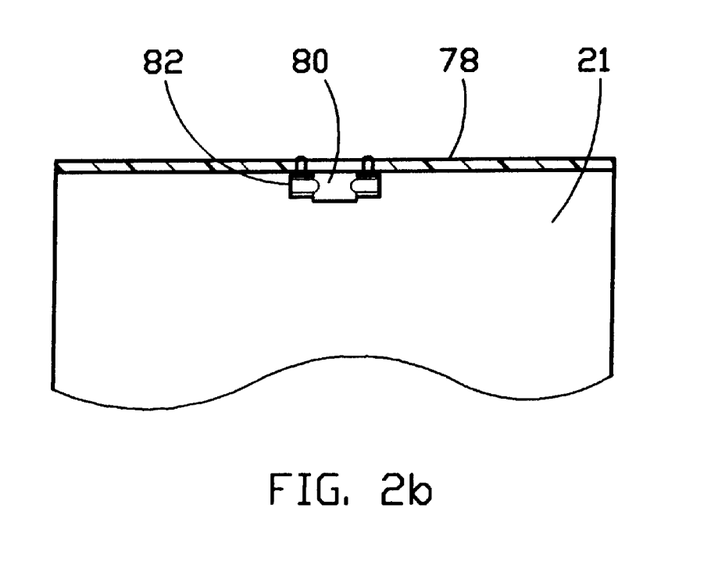
FIG. 2b is a plan view of a male snap engaged in a female snap for attachment of a work surface to the top of a drawer in accordance with the present invention.

With reference to FIGS. 2–2b, a top drawer 21 of the tool chest 10 is modified to be used as a work surface 23. The work surface 23 includes a work pad 78, a male snap 80, and a female snap 82. A rear of the work pad 78 is fastened to a rear of the drawer 21. A male snap 80 is attached to a bottom of the work pad 78 and a female snap 82 is attached to the inside of the drawer 21. The male snap 80 may be swapped with the female snap 82 and the female snap 82 swapped with the male snap 80. A plurality of dividers 84 support the work pad 78. The work pad 78 is preferably fabricated from a thick rubber plate so the work pad 78 may be rolled back to allow tools to be placed between the dividers 84.

Figure 5:
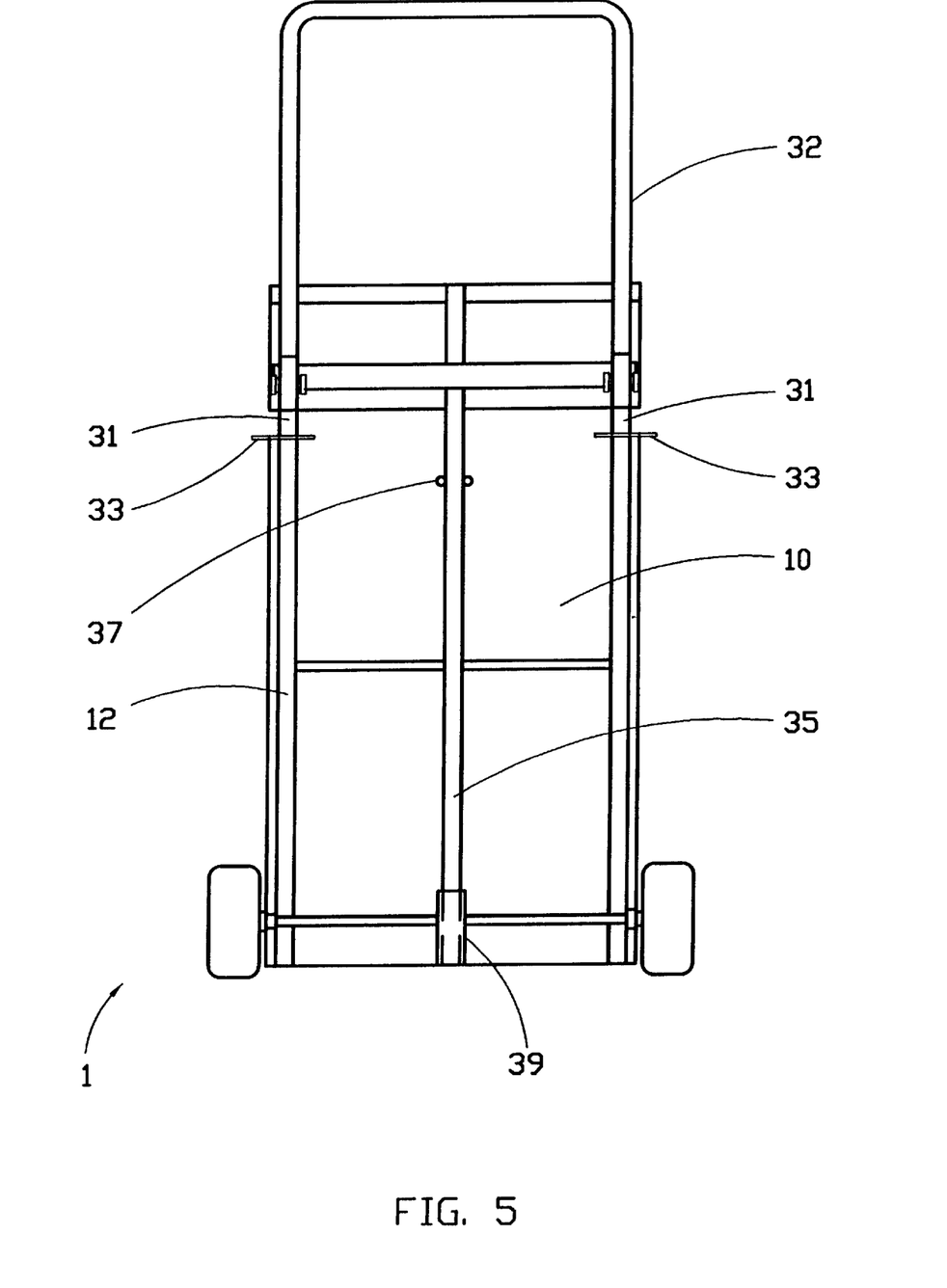
FIG. 5 is a rear view of a tool cart in accordance with the present invention.

FIG. 5 shows a collapsible cable pulling pole 35 is attached to the back of the tool chest 10 with a tube retainer 39 and a snap retainer 37. The tube retainer 39 is preferably a short piece of PVC tubing that is attached to a bottom of the tool chest 10. The snap retainer 37 may be purchased from Hugger, Inc. The collapsible cable pulling pole 35 is inserted into the tube retainer 39 and snapped into the snap retainer 37.

Figure 6:
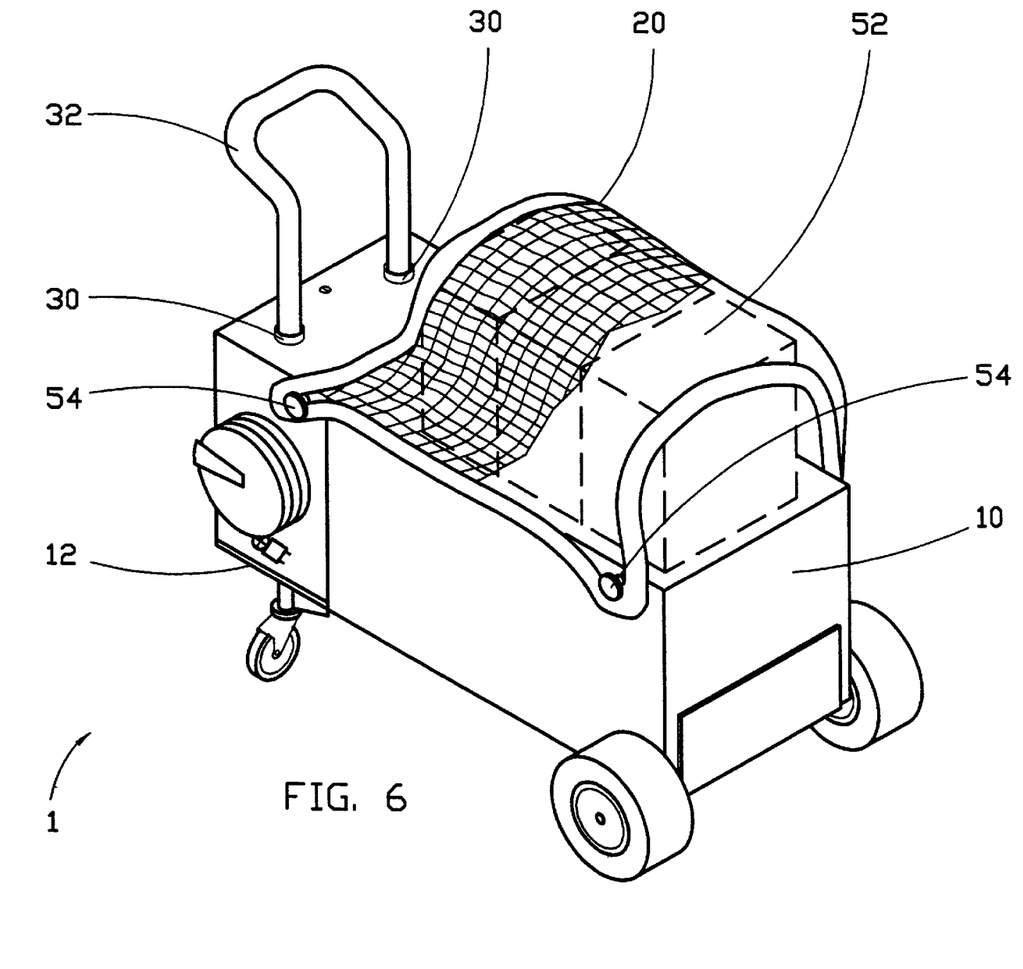
FIG. 6 is a perspective view of a tool cart in a horizontal position for transporting tools and material in accordance with the present invention.

FIG. 6 shows the tool cart 1 in a horizontal position for transporting the tools and materials to and from a work site.

The push handle 32 is inserted through the two handle tubes 30 into the convertible hand truck 12. The tool cart 10 may be rotated to a vertical work position by first withdrawing the push handle 32 from the two handle tubes 30 in the convertible hand truck 12. With reference to FIG. 5, the push handle 32 is then inserted into the support tubes 31. The push handle 32 is locked into place with two lock pins 33 which are inserted into a hole in the push handle and support tubes 31. The tool cart 10 is then rotated by lifting the push handle 32 upward such that the tool cart 10 is placed in a vertical position as shown in FIGS. 1 and 5.

Figure 6A:
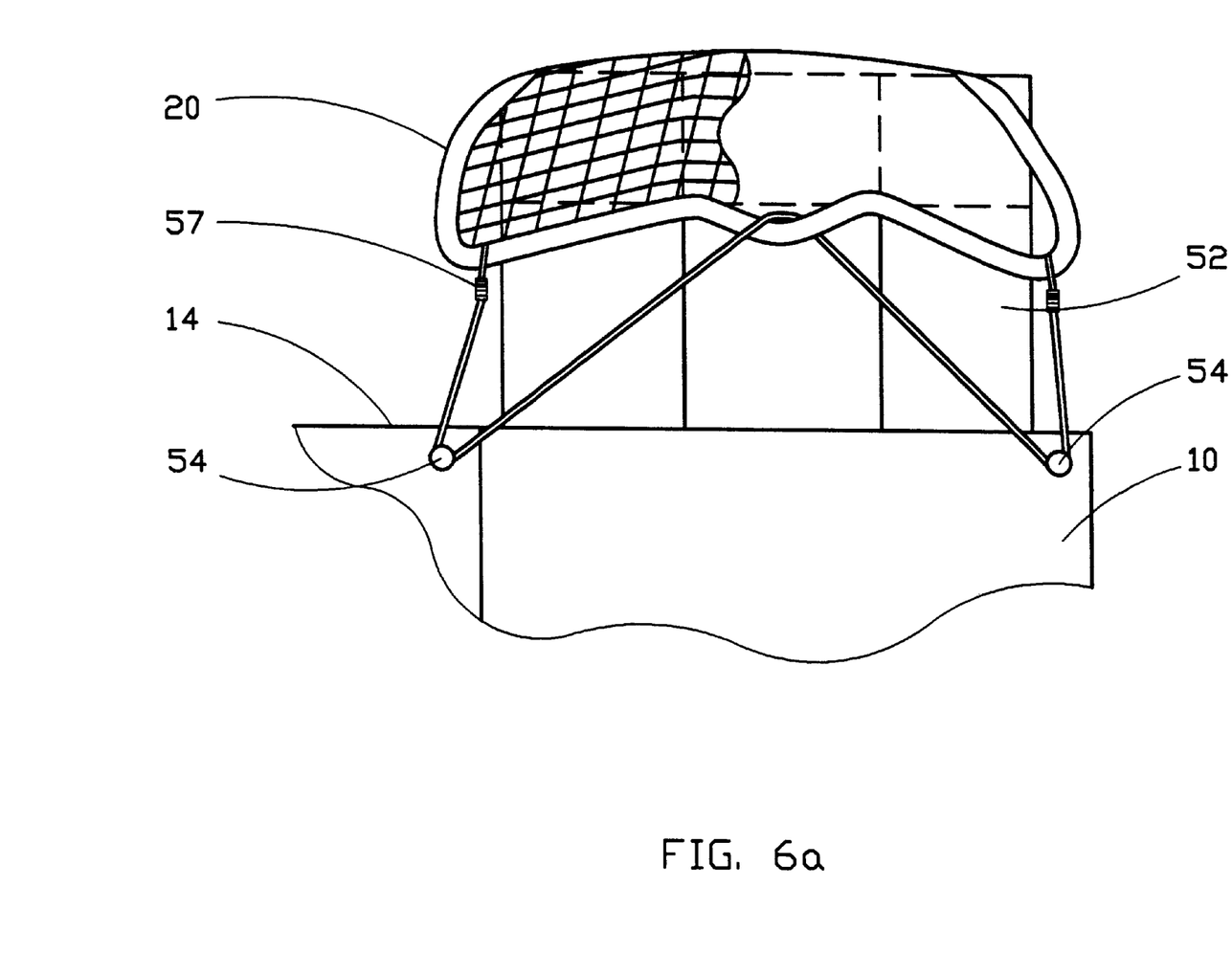
FIG. 6a is a side view of a netting structure retaining spools of wire on a tool chest with a bungee cord in accordance with the present invention.

Spools of wire 52 may be transported utilizing the tool cart 1. The spools of wire 52 are placed on the front of the tool chest 10. A netting structure 20 is pulled over the spools of wire 52 and a plurality of projections 54 to prevent the spools of wire 52 from falling off the tool cart 10 during transport. With reference to FIG. 6a, a bungee cord 57 is inserted through the middle of the netting structure 20, looped around the two projections 54, and attached to the ends of the netting structure 20 to retain spools of wire 52 during transport.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

I claim:

1. A tool cart comprising:
   a tool chest having a plurality of drawers;
   a tool box having a top opening lid, said tool box being attached to a top of said tool chest;
   a hand truck retaining said tool chest and said hand truck, said hand truck being positionable in a horizontal or vertical position; and
   at least one storage bag being fastened to said tool chest each said storage bag having a middle portion which may be zipped up and down with a zipper handle; and a first and second horizontal zippers being disposed at substantially a bottom of said storage bag.

2. The tool cart of claim 1, further comprising:
   a first handle tube being formed in said tool box on substantially one side thereof and a second handle tube being formed on substantially the opposite side thereof, the inside diameter of each handle tube being sized to loosely receive a push handle.

3. The tool cart of claim 1, further comprising:
   a tool tray having a bottom, side walls, and flaps being fastened to a tool chest drawer, a plurality of tools being secured with at least one hook fastener strip and at least one loop fastener strip, said flaps being secured to each other with at least one hook fastener pad and loop fastener pad.

4. The tool cart of claim 1, further comprising:
   a work surface being fastened to a rear of a tool chest drawer and attachable to a front of said tool chest drawer, a plurality of dividers supporting said work surface.

5. The tool cart of claim 1, further comprising:
   a netting structure being fastenable to a plurality of projections, said netting structure retaining material during transit.

6. The tool cart of claim 1, further comprising:
   a bungee cord and netting structure being used to retain material during transit.

7. A tool cart comprising:

a tool chest having a plurality of drawers;

a tool box having a top opening lid, said tool box being attached to a top of said tool chest;

a hand truck retaining said tool chest and said hand truck, said hand truck being positionable in a horizontal or vertical position;

at least one extension cord reel being attached to a side of said tool box;

at least one storage bag being fastened to said tool chest each said storage bag having a middle portion which may be zipped up and down with a zipper handle; and a first and second horizontal zippers being disposed at substantially a bottom of said storage bag.

8. The tool cart of claim 7, further comprising:

a first extension cord reel being electrically connected to a multiple position electrical outlet, a second extension cord reel being electrically connected to a second electrical cord reel.

9. The tool cart of claim 7, further comprising:

a first handle tube being formed in said tool box on substantially one side thereof and a second handle tube being formed on substantially the opposite side thereof, the inside diameter of each handle tube being sized to loosely receive a push handle.

10. The tool cart of claim 7, further comprising:

a tool tray having a bottom, side walls, and flaps being fastened to a tool chest drawer, a plurality of tools being secured with at least one hook fastener strip and at least one loop fastener strip, said flaps being secured to each other with at least one hook fastener pad and loop fastener pad.

11. The tool cart of claim 7, further comprising:

a work surface being fastened to a rear of a tool chest drawer and attachable from a front of said tool chest drawer, a plurality of dividers supporting said work surface.

12. The tool cart of claim 7, further comprising:

a netting structure being fastenable to a plurality of projections, said netting structure retaining material during transit.

13. The tool cart of claim 7 further comprising:

a bungee cord and netting structure being used to retain material during transit.

14. A tool cart comprising:

a tool chest having a plurality of drawers;

a tool box having a top opening lid, said tool box being attached to a top of said tool chest;

a hand truck retaining said tool chest and said hand truck, said hand truck being positionable in a horizontal or vertical position;

at least one extension cord reel being attached to a side of said tool box;

at least one storage bag being fastened to said tool chest each said storage bag having a middle portion which may be zipped up and down with a zipper handle;

a first and second horizontal zippers being disposed at substantially a bottom of said storage bag; and a first extension cord reel being electrically connected to a multiple position electrical outlet, a second extension cord reel being electrically connected to a second electrical cord reel.

15. The tool cart of claim 14, further comprising:

a first handle tube being formed in said tool box on substantially one side thereof and a second handle tube being formed on substantially the opposite side thereof, the inside diameter of each handle tube being sized to loosely receive a push handle.

16. The tool cart of claim 14, further comprising:

a tool tray having a bottom, side walls, and flaps being fastened to a tool chest drawer, a plurality of tools being secured with at least one hook fastener strip and at least one loop fastener strip, said flaps being secured to each other with at least one hook fastener pad and loop fastener pad.

17. The tool cart of claim 14, further comprising:

a work surface being fastened to a rear of a tool chest drawer and attachable from a front of said tool chest drawer, a plurality of dividers supporting said work surface.

18. The tool cart of claim 14, further comprising:

a netting structure being fastenable to a plurality of projections, said netting structure retaining material during transit.

19. The tool cart of claim 14, further comprising:

a bungee cord and netting structure being used to retain material during transit.

20. The tool cart of claim 1, further comprising: a first extension cord reel being electrically connected to a multiple position electrical outlet, a second extension cord reel being electrically connected to said first electrical cord reel.

* * * * *